United States Patent Office 2,958,629
Patented Nov. 1, 1960

1

2,958,629

PREPARATION OF VACCINE WITH BRUCELLA KILLED BY PATULIN COMPOUNDS

Marc Maurice Vermeulen, Etterbeek, Brussels, Belgium (Institut für Virusforschung und Experimentelle Medizin, Sielbeck, near Eutin, Germany)

No Drawing. Filed Apr. 19, 1954, Ser. No. 424,268

Claims priority, application Belgium Apr. 25, 1953

2 Claims. (Cl. 167—78)

The present invention relates to a process for the preparation of vaccines and to vaccines obtained by means of this process.

It is known that vaccination can produce a specific immunity in the human or animal organism against certain pathogenic organisms, this immunity being due to substances possessing the power to create specifically active antibodies and known under the general term "antigens."

The antigen, the protein nature of which is generally admitted, has the property of combining with the corresponding antibody and thus forming an immunising complex.

It is known that antigens can be altered or denatured or even destroyed by various physical or chemical actions. Thus heat, cold and light can exercise a detrimental effect upon the antigens. The same applies to certain chemical compounds, such as strong acids, alkalis, salts of heavy metals, ethyl alcohol, acetone, ether, formaldehyde, urea, etc.

The degree of denaturation of the antigens varies according to the intensity of the physical action or according to the chemical compound employed.

In order to avoid an alteration of the antigens it has been proposed to prepare vaccines from viable and nonvirulent organisms. If it is true that, in this kind of preparation, the antigenic power is safeguarded, the presence in these vaccines of live and non-virulent germs, at all times, risks the creation of certain endemic centres. It has been found, after various trials, that live and avirulent germs, employed for the preparation of certain vaccines, can be transferred to non-infected subjects and play the role of an antigen.

The present invention has for an object a process for the preparation of vaccines by which change or denaturation of the antigen is avoided whilst totally inhibiting the bacterial organisms.

It is known that various antibiotics inhibit the growth of certain bacteria. Thus it is known that streptomycin, aureomycin, patulin and other antibiotics exercise a bacteriostatic action on certain bacteria, such as those of the genus Brucella, notably *Brucella abortus* which is the pathogenic agent of Bang's disease.

It has been found—and the present invention is based on this discovery—that patulin and derivatives thereof i.e. the thiosemicarbazone of patulin, brought into the presence of bacteria whose growth they inhibit, do not at all alter the antigen elaborated by these bacteria.

It has been found, in a surprising manner, that the property of not altering the antigen is peculiar to patulin and to derivatives thereof which still retain however their inhibitory power.

The present invention therefore relates to a process for the preparation of vaccines, this process being characterised in that one firstly inhibits by means of an antibiotic, such as patulin or a derivative of patulin, notably the thiosemicarbazone of patulin, bacterial organisms

2 sensitive to this antibiotic in such a way that alteration of the antigen is avoided.

According to a feature of the process according to the invention, one introduces patulin or one of its derivatives, in such a quantity that bacterial inhibition is complete, into a suspension of bacteria of a known antigenic power and sensitive to this antibiotic, in a sterile medium, containing from $10^9$ to $10^{12}$ bacterial organisms per cc. One should avoid adding an excess of antibiotic over that necessary for complete inhibition of the bacteria.

After formation of the autolysate an adsorbent material is added, such as hydrated alumina, to adsorb the antigen. The quantity of hydrated alumina should be from 0.5 to 1% by weight of the initial bacterial suspension.

The invention also includes vaccines obtained by the process defined above, these vaccines consisting of an autolysate of a suspension, in a sterile medium, of bacteria previously inhibited by patulin or one of its derivatives such as the thiosemicarbazone of patulin.

In order that the invention may be well understood the following examples are given only as illustrations.

EXAMPLE 1

*Preparation of an antibrucellic vaccine*

A culture $Ma_2$, mutant of the culture S (smooth) of *Brucella abortus*, is cultured in a medium according to the method generally employed. When maximum growth is achieved, the bacteria are separated from their culture medium by centrifugation. The centrifugation product obtained is then washed by means of a buffer solution at pH 6.5, in order to remove from the bacteria the nutrient liquid which served for their growth. The centrifuged deposit thus freed from nutrient liquid is suspended in a sterile medium such that the bacterial concentration is $10^9$ to $10^{12}$ per cc. Patulin is then introduced in a sufficient quantity, such that the bacterial inhibition is complete, excess being however avoided. The bacterial suspension thus treated with patulin is then placed in a refrigerator and cooled for a period of approximately eight weeks, until an autolysate is obtained without substantial lysis of elaborated antigen.

At the end of this period, a check is made to determine whether all the bacteria have been inhibited and if the autolysis has been completed. For this purpose, one can, for example, inoculate a nutrient medium favourable for the growth of *Brucella abortus* with a sample of the autolysate. If the inhibition and the autolysis are complete, the culture test will be negative.

To the autolysate is added from 0.5 to 1% of hydrated alumina prepared according to the method of Myrbäck and Barmann (Handbuch der Enzymforschung). The autolysate, containing the hydrated alumina is intermittently shaken for approximately 24 hours, so as to cause adsorption of the antigen on this hydrate.

Subsequently a check is made to determine whether all the antigen has been adsorbed by the hydrated alumina. For this purpose a fraction of the suspension obtained after the aforesaid shaking is removed. This fraction is centrifuged and the filtrate is injected into mice, which are then injected with a lethal dose of *Brucella abortus*. If the mice survive this treatment, one has proof that the filtrate in question still contains antigen and, therefore, that the adsorption of the antigen by the hydrated alumina has been incomplete. On the other hand, if the mice die, it can be said that the antigen has been adsorbed in a substantially complete manner.

In the latter case a vaccine is obtained which, when administered to animals, gives them a long-term immunity against infection due to *Brucella abortus*. It will be clear that the preparation of the vaccine must be carried out with the exclusion of all possible contamination.

EXAMPLE 2

*Preparation of an antibrucellic vaccine*

One proceeds as in Example 1, but instead of patulin, the thiosemicarbazone of patulin is employed.

EXAMPLE 3

*Preparation of an antityphoid vaccine*

One proceeds as in Example 1 or as in Example 2, starting with a culture of typhoid bacilli the antigenic power of which is known.

EXAMPLE 4

*Comparative assays of various vaccines*

The following products were used for the assays:
(a) vaccin obtained by the process of Example 1;
(b) Buck 19 vaccine;
(c) pseudo-vaccine obtained by the process of Example 1, but employing streptomycin instead of patulin.

Two doses of 1 cc. of the products (a) and (c), defined above, were injected, at several days interval, into young cattle free from brucellosis. According to the usual method, 5 ccs. of the vaccine B19 (b) were administered to young cattle free of brucellosis. After several weeks, serum was taken from the three groups of vaccinated animals. Mice were then inoculated at the rate of 2 x 0.1 cc. of serum, at 10 days' interval. After inoculation of the serum, the mice received a lethal dose of *Brucella abortus*.

The following table shows the mean percentage of vaccinated mice which resisted the lethal dose of *Brucella abortus*.

| Products | Average percentage of surviving mice |
|---|---|
| Vaccine according to the invention | ±98 |
| Vaccine B.19 | ±30 |
| Pseudo-vaccine (with streptomycin) | 5 to 10 |

It is clear that the invention is not strictly limited to the details described above and that various modifications can be applied to these details, without deviating from the scope of the invention, as it is defined in the following claims.

What I claim is:

1. A process for the preparation of a vaccine for veterinary purposes which comprises: (1) culturing Brucella in a culture medium until maximum growth is achieved, (2) separating Brucella from the culture medium, (3) suspending in a sterile medium Brucella freed from the culture medium to obtain a suspension containing from $10^9$ to $10^{12}$ bacteria per cc., (4) introducing an antibiotic selected from the group consisting of patulin and the thiosemicarbazone of patulin into the resulting bacterial suspension in a quantity just sufficient to inhibit completely the growth of the Brucella, whereby alteration of the antigen elaborated by the Brucella is avoided, (5) cooling the bacterial suspension containing said antibiotic until complete autolysis of the Brucella takes place without substantial lysis of the antigen and an autolysate is obtained, (6) adding an absorbent for the antigen to the autolysate, and (7) shaking the autolysate to cause adsorption of all the antigen on said adsorbent.

2. The process for the preparation of a vaccine for veterinary purposes which comprises: (1) culturing *Brucella abortus* in a culture medium until maximum growth is achieved, (2) separating *Brucella abortus* from the culture medium, (3) suspending in a sterile medium *Brucella abortus* freed from the culture medium to obtain a suspension containing from $10^9$ to $10^{12}$ bacteria per cc., (4) introducing an antibiotic selected from the group consisting of patulin and the thiosemicarbazone of patulin into the resulting bacterial suspension in a quantity just sufficient to inhibit completely the growth of the *Brucella abortus*, whereby alteration of the antigen elaborated by the *Brucella abortus* is avoided, (5) cooling the bacterial suspension containing said antibiotic until complete autolysis of the *Brucella abortus* takes place without substantial lysis of the antigen and an autolysate is obtained, (6) adding an adsorbent for the antigen to the autolysate, and (7) shaking the autolysate to cause adsorption of all the antigen on said adsorbent.

References Cited in the file of this patent
UNITED STATES PATENTS 2,340,318    Gerlough _____ Feb. 1, 1944

OTHER REFERENCES

Karel et al.: Dictionary of Antibiosis, pub. Columbia Univ. Press, 1951, pp. 80, 81, and 79.

Neter et al.: J. Bact., vol. 48, 1944, p. 261.

Beal: Proc. Soc. Exp. Biol. and Med., vol. 64, January 1947, pp. 118–120.

Fesenfeld et al.: Biol. Abst., vol. 25, No. 5, p. 1309, May 1951.

Cabasso et al.: Biol. Abst., December 1952, vol. 26, No. 15, p. 3103.